(12) United States Patent
Matsushita et al.

(10) Patent No.: US 9,803,658 B2
(45) Date of Patent: Oct. 31, 2017

(54) VEHICLE HYDRAULIC CONTROL DEVICE

(71) Applicant: AISIN AW CO., LTD., Anjo-shi, Aichi-ken (JP)

(72) Inventors: Junji Matsushita, Anjo (JP); Hironari Toyoda, Toyota (JP)

(73) Assignee: AISIN AW CO., LTD., Anjo (JP)

( * ) Notice: Subject to any disclaimer, the term of this patent is extended or adjusted under 35 U.S.C. 154(b) by 535 days.

(21) Appl. No.: 14/414,566

(22) PCT Filed: Aug. 2, 2013

(86) PCT No.: PCT/JP2013/071037
§ 371 (c)(1),
(2) Date: Jan. 13, 2015

(87) PCT Pub. No.: WO2014/030528
PCT Pub. Date: Feb. 27, 2014

(65) Prior Publication Data
US 2015/0192150 A1    Jul. 9, 2015

(30) Foreign Application Priority Data

Aug. 23, 2012   (JP) ................................ 2012-184385

(51) Int. Cl.
*F16H 57/04* (2010.01)
*F15B 11/08* (2006.01)
(Continued)

(52) U.S. Cl.
CPC .............. *F15B 11/08* (2013.01); *B60K 6/445* (2013.01); *B60W 10/30* (2013.01); *F15B 13/024* (2013.01);
(Continued)

(58) Field of Classification Search
CPC .................................................. F16H 57/0476
See application file for complete search history.

(56) References Cited

U.S. PATENT DOCUMENTS 5,718,302 A * 2/1998 Hasebe .................... B60K 1/00
180/60
2011/0232786 A1* 9/2011 Matsushita ............ B60K 6/445
137/565.11

(Continued)

FOREIGN PATENT DOCUMENTS

JP      H09-53603 A    2/1997
JP      H10-141036 A   5/1998
(Continued)

OTHER PUBLICATIONS

Oct. 29, 2013 International Search Report issued in International Patent Application No. PCT/JP2013/071037.

*Primary Examiner* — William Kelleher
*Assistant Examiner* — Gregory Prather
(74) *Attorney, Agent, or Firm* — Oliff PLC (57) ABSTRACT

A vehicle hydraulic control device for a rotating electrical machine and associated gear mechanism. Oil passages are configured with relief valves such that a first relief valve discharges oil in a first oil passage when an oil pressure in the first oil passage located downstream of a throttle portion becomes higher than a predetermined first set oil pressure, and a second relief valve allows a part of the second oil passage which is located upstream of the second relief valve to communicate with a part of the second oil passage which is located downstream of the second relief valve when an oil pressure in the second oil passage located upstream of the second relief valve becomes higher than a predetermined second set oil pressure set higher than the first set oil pressure.

14 Claims, 3 Drawing Sheets

(51) Int. Cl.
*B60K 6/445* (2007.10)
*B60W 10/30* (2006.01)
*F15B 13/02* (2006.01)

(52) U.S. Cl.
CPC ..... *F16H 57/0435* (2013.01); *F16H 57/0476* (2013.01); *Y02T 10/6239* (2013.01)

(56) References Cited

U.S. PATENT DOCUMENTS

| | | | | |
|---|---|---|---|---|
| 2015/0012191 A1* | 1/2015 | Ohya | ................... | B60W 10/11 701/53 |
| 2015/0114497 A1* | 4/2015 | Herrmann | ........... | F16H 57/0413 137/599.14 |
| 2016/0069428 A1* | 3/2016 | Takayanagi | ............ | B60K 6/383 60/420 |

FOREIGN PATENT DOCUMENTS

| | | | |
|---|---|---|---|
| JP | 2002-276322 A | 9/2002 |
| JP | 2006-067640 A | 3/2006 |
| JP | 2008-190636 A | 8/2008 |
| JP | 2011-235806 A | 11/2011 |

* cited by examiner

VEHICLE HYDRAULIC CONTROL DEVICE

TECHNICAL FIELD

The preferred embodiments relate to hydraulic control devices including an oil pump that is driven by a driving force source for wheels, and an oil passage that guides oil discharged from the oil pump to a rotating electrical machine that forms at least a part of the driving force source and a gear mechanism to which driving force from the driving force source is transmitted.

BACKGROUND ART

In recent years, hybrid vehicles having both an internal combustion engine and a motor as a rotating electrical machine mounted thereon as a driving force source, electric vehicles having only a rotating electrical machine mounted thereon as a driving force source, etc. are known in the art.

In drive devices for such vehicles, an oil pressure is typically generated by an oil pump, so that oil for lubrication is supplied to each gear mechanism forming a powder distribution mechanism, a speed reduction mechanism, etc., and oil for lubrication or cooling is supplied to the rotating electrical machine. If the oil for lubrication is not sufficiently supplied to each gear mechanism in such drive devices, bearings etc. may be seized up by friction heat generated by rotation, or the tooth surfaces of each gear may be worn. If the oil for lubrication is excessively supplied to each gear mechanism, loss may be increased which is caused by the gear mechanism stirring oil when it rotates. It is therefore desirable to supply an appropriate amount of lubrication oil to each gear mechanism. The amount of heat that is generated by the rotating electrical machine varies according to the operating state. If oil supply is not sufficient in a situation where the rotating electrical machine generates a large amount of heat, the rotating electrical machine may not be sufficiently cooled by the oil and may be overheated. On the other hand, if a large amount of oil is supplied in a situation where the rotating electrical machine generates a small amount of heat, loss may be excessively increased which is caused by a rotor stirring oil when it rotates. It is therefore desirable to supply an appropriate amount of oil to the rotating electrical machine as well.

Such a technique as in Patent Document 1 is proposed as a technique that improves cooling capability of a rotating electrical machine while reducing loss that is caused by the rotating electrical machine stirring oil. In the technique of Patent Document 1, a relief valve is provided in a main passage that supplies oil from an oil pump to rotating electrical machines, a reduction gear, a power distribution integrating mechanism, etc., and a solenoid valve that is opened and closed according to the temperature of the rotating electrical machines is provided in a return passage between the relief valve and an oil pan. The relief valve returns a part of oil to the oil pan via the return passage if the amount of oil discharged from the oil pump that is driven by an internal combustion engine becomes equal to or larger than a certain amount. In the technique of Patent Document 1, when the temperature of the rotating electrical machines is low, the solenoid valve is opened in order to prioritize reduction in stirring loss, thereby reducing the amount of oil that is supplied to the rotating electrical machines, the reduction gear, the power distribution integrating mechanism, etc. via the main passage. On the other hand, when the temperature of the rotating electrical machines is high, the solenoid valve is closed in order to prioritize cooling of the rotating electrical machines, thereby increasing the amount of oil that is supplied to the rotating electrical machines, the reduction gear, the power distribution integrating mechanism, etc. via the main passage. In the technique of Patent Document 1, opening and closing of the solenoid valve is controlled based on the temperature, and whether the relief valve can be operated or not is controlled according to the state of the solenoid valve. This can reduce an operation set pressure for the relief valve, and can reduce the amount of oil that is supplied from the oil pump to the power distribution integrating mechanism and the reduction gear in the state where cooling of the rotating electrical machine is not required, whereby stirring loss of the power distribution integrating mechanism and the reduction gear can be reduced.

In the technique of Patent Document 1, however, temperature detection sensors for the rotating electrical machines are required, whether or not the temperature of the rotating electrical machines detected by the temperature sensors is equal to or lower than a preset valve opening temperature need be determined, and the operation of opening or closing the solenoid valve need be performed according to the determination result. The device configuration is therefore relatively complicated.

RELATED ART DOCUMENT

Patent Document

[Patent Document 1] Japanese Patent Application Publication No. 2011-235806 (JP 2011-235806 A)

SUMMARY

Problem to be Solved

It is therefore desired to implement a vehicle hydraulic control device capable of supplying an appropriate amount of oil to both a gear mechanism and a rotating electrical machine by a simple configuration.

Means for Solving the Problem

According to invention preferred embodiment, a vehicle hydraulic control device including: an oil pump that is driven by a driving force source for wheels; and an oil passage that guides oil discharged from the oil pump to a rotating electrical machine that forms at least a part of the driving force source and a gear mechanism to which driving force from the driving force source is transmitted is characterized in that the oil passage includes a common oil passage connected to the oil pump, a first oil passage connected to the common oil passage to guide oil flowing from the common oil passage into the first oil passage to the gear mechanism, and a second oil passage branching off from a connection portion between the common oil passage and the first oil passage to guide oil flowing from the common oil passage into the second oil passage to the rotating electrical machine, a first relief valve and a throttle portion placed upstream of the first relief valve are provided in the first oil passage, a second relief valve is provided in the second oil passage, the first relief valve discharges oil in the first oil passage when an oil pressure in the first oil passage located downstream of the throttle portion becomes higher than a predetermined first set oil pressure, the second relief valve allows a part of the second oil passage which is located upstream of the second relief valve to communicate with a part of the second oil passage which is located downstream of the second relief valve when an oil pressure in the second oil passage located upstream of the second relief valve becomes higher than a predetermined second set oil pressure, and the second set oil pressure is set to an oil pressure higher than the first set oil pressure.

As used herein, the term "rotating electrical machine" is used as a concept including a motor (electric motor), a generator (electric generator), and a motor generator that functions as both a motor and a generator as necessary.

According to this characteristic configuration, since the oil pressure in the first oil passage is controlled to an oil pressure equal to or less than the first set oil pressure as an operation set pressure for the first relief valve, the flow rate of oil that is supplied to the gear mechanism is controlled to be in a proper range, and excessive oil supply to the gear mechanism can be suppressed. This can suppress an excessive increase in loss that is caused by the gear mechanism stirring oil when it rotates. The throttle portion is provided upstream of the first relief valve. Therefore, even in the state where the oil pressure in the first oil passage located downstream of the throttle portion is controlled to the first set oil pressure by the relief valve, the oil pressure in the oil passage located upstream of the throttle portion becomes higher than the first set oil pressure as a discharge pressure of the oil pump increases. Accordingly, the oil pressure in the second oil passage located upstream of the second relief valve also becomes higher than the first set oil pressure. The second relief valve having its operation set pressure set to the second set oil pressure higher than the first set oil pressure can thus be operated while controlling the oil pressure in the first oil passage located downstream of the throttle portion to the first set oil pressure. The flow rate of oil that is supplied to the gear mechanism can therefore be controlled to be in the proper range, and excess oil can be supplied to the rotating electrical machine via the second oil passage.

The oil pump is driven by the driving force source for the wheels. Accordingly, load on the rotating electrical machine that forms at least a part of the driving force source is also likely to be high when the oil pump has a high discharge pressure. According to the above characteristic configuration, the discharge pressure of the oil pump is increased and oil is supplied to the rotating electrical machine in a situation where the load on the rotating electrical machine is high and cooling or lubrication of the rotating electrical machine is particularly required. Therefore, oil can be appropriately supplied in a situation where there is a particularly strong need to supply oil to the rotating electrical machine. As described above, according to this characteristic configuration, an appropriate amount of oil can be supplied to both the gear mechanism and the rotating electrical machine by a simple configuration.

It is preferable that the vehicle hydraulic control device further include: a third oil passage that branches off from a branch portion located downstream of the first relief valve in the first oil passage and guides oil flowing from the first oil passage into the third oil passage to the rotating electrical machine.

According to this configuration, oil discharged from the oil pump can be supplied to the rotating electrical machine sequentially via the common oil passage, the first oil passage, and the third oil passage in this order. That is, the oil discharged from the oil pump can be supplied to the rotating electrical machine via neither the second oil passage nor the second relief valve. Accordingly, oil can be steadily supplied to the rotating electrical machine even in a situation where the oil pump has a low discharge pressure and the load on the rotating electrical machine is likely to be low. In a situation where cooling or lubrication of the rotating electrical machine is particularly required, the discharge pressure of the oil pump is increased and the second relief valve is operated as described above, whereby a larger amount of oil can be supplied to the rotating electrical machine via the second oil passage and the second relief valve.

It is preferable that the second relief valve allow an upstream side of the second relief valve to communicate with a downstream side of the second relief valve at an oil pressure lower than such an upper limit oil pressure that a part having lowest pressure resistance in an entire hydraulic circuit communicating with the common oil passage can withstand.

According to this configuration, at an oil pressure lower than such an upper limit oil pressure that the part having the lowest pressure resistance in the entire hydraulic circuit communicating with the common oil passage can withstand, the upstream side of the second relief valve is allowed to communicate with the downstream side of the second relief valve, so that oil is supplied to the rotating electrical machine. The oil pressure in the entire hydraulic circuit can thus be made not to exceed the upper limit oil pressure.

It is preferable that the throttle portion be configured so that when the first relief valve is discharging oil in the first oil passage, the oil pressure in the second oil passage located upstream of the second relief valve be higher than the first set oil pressure.

According to this configuration, communication between t upstream side of the second relief valve and the downstream side of the second relief valve can be suppressed in the case where the oil pressure in the first oil passage located downstream of the throttle portion is lower than the first set oil pressure, that is, when the first relief valve is not discharging oil in the first oil passage. The flow rate of oil that is supplied to the gear mechanism can therefore be controlled to be in the proper range, and excess oil can be supplied to the rotating electrical machine via the second oil passage.

It is preferable that such an oil pressure in the first oil passage that supplies oil to the gear mechanism at a maximum flow rate required to lubricate the gear mechanism be a maximum required oil pressure, and the first set oil pressure be set to an oil pressure in a predetermined range whose lower limit is the maximum required oil pressure.

According to this configuration, the first set oil pressure is set to an oil pressure in the predetermined range whose lower limit is the maximum required oil pressure. This can suppress oil supply to the gear mechanism at a flow rate that is too high with respect to the maximum flow rate required to lubricate the gear mechanism, and therefore can suppress loss that is caused by the gear mechanism stirring oil when it rotates.

MODES FOR CARRYING OUT THE INVENTION

Figure 1:
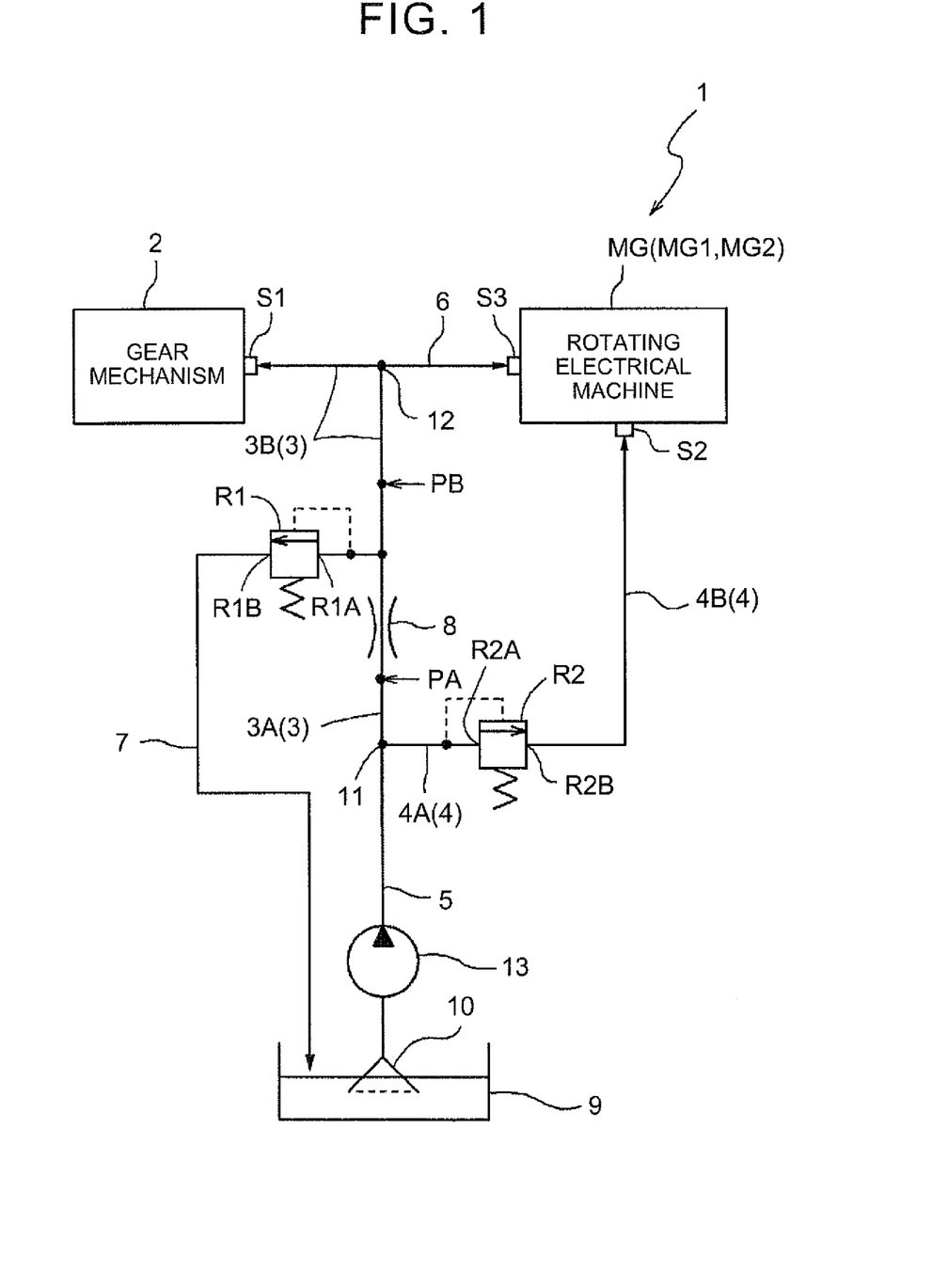
FIG. 1 is a diagram showing the configuration of a hydraulic circuit.
Figure 2:
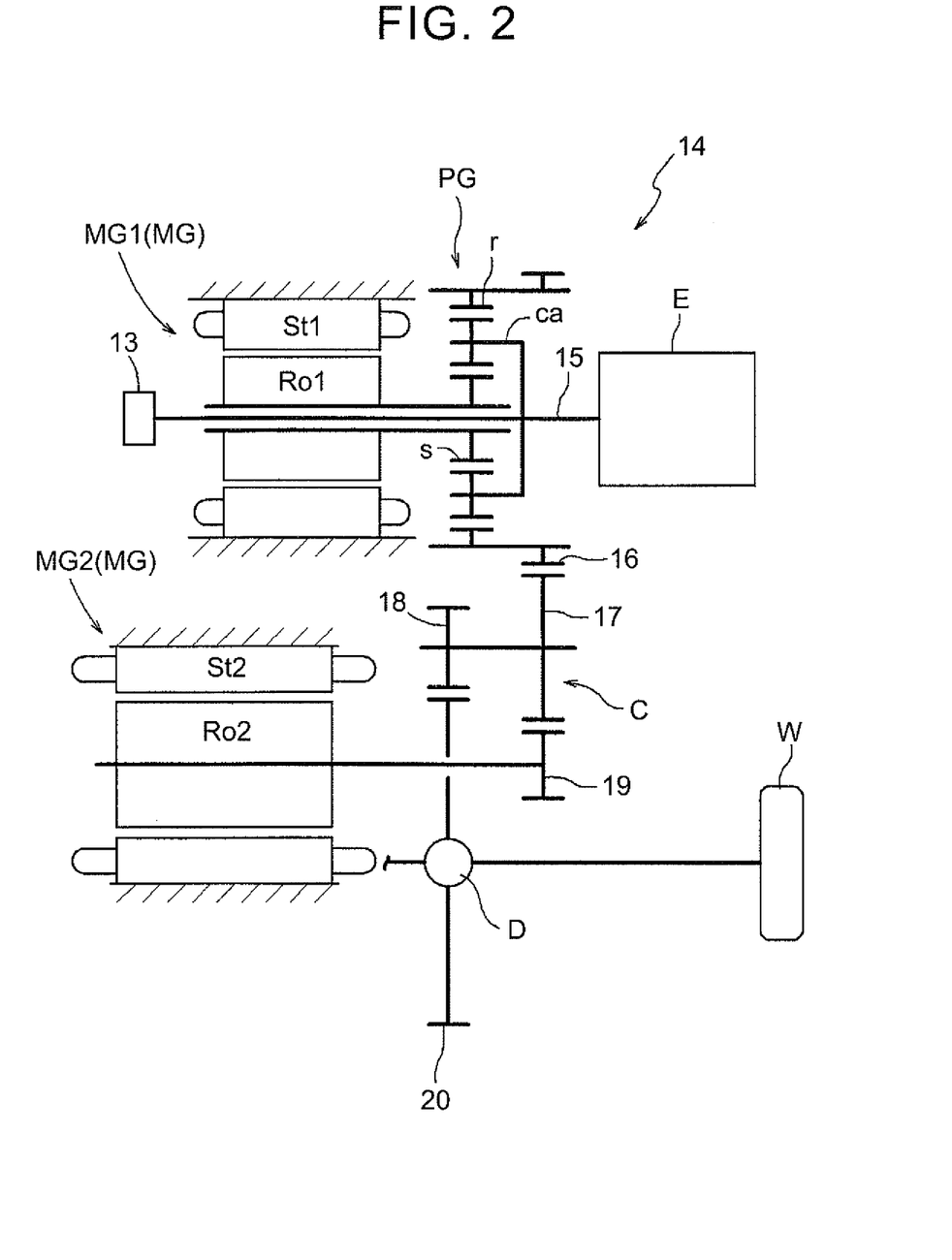
FIG. 2 is a skeleton diagram showing the mechanical configuration of a vehicle drive device.

An embodiment will be described with reference to the accompanying drawings. FIG. 1 is a diagram showing the configuration of a hydraulic circuit of a hydraulic control device 1 according to the present embodiment. FIG. 2 is a skeleton diagram showing the mechanical configuration of a vehicle drive device 14 according to an embodiment. As shown in FIG. 2, this vehicle drive device 14 is configured as a drive device for so-called 2-motor split type hybrid vehicles which includes an internal combustion engine E and two rotating electrical machines MG1, MG2 as a driving force source, and includes a power distribution planetary gear unit PG that distributes output of the internal combustion engine E toward the first rotating electrical machine MG1 and toward wheels W and the second rotating electrical machine MG2. In the following description, the first rotating electrical machine MG1 and the second rotating electrical machine MG2 are collectively referred to as the "rotating electrical machines MG," and the power distribution planetary gear unit PG, a counter gear mechanism C, and an output differential gear unit D are collectively referred to as the "gear mechanism 2," unless otherwise specified. A first oil passage 3, a second oil passage 4, a common oil passage 5, a third oil passage 6, and a discharge oil passage 7 are collectively referred to as the "oil passages 3 to 7."

1. Configuration of Vehicle Drive Device

As shown in FIG. 2, the vehicle drive device 14 includes an input shaft 15 drivingly coupled to the internal combustion engine E, the first rotating electrical machine MG1, the second rotating electrical machine MG2, the power distribution planetary gear unit PG, the counter gear mechanism C, the output differential gear unit D that distributes rotation and driving force transmitted thereto via the counter gear mechanism C to a plurality of wheels W, and an oil pump 13 whose rotor is coupled to the input shaft 15 and which is driven by the internal combustion engine E. The planetary gear unit PG distributes rotation and driving force of the internal combustion engine E to the first rotating electrical machine MG1 and the counter gear mechanism C.

In this vehicle drive device 14, the input shaft 15 drivingly coupled to the internal combustion engine E, the first rotating electrical machine MG1, and the planetary gear unit PG are arranged on the same axis. The second rotating electrical machine MG2, the counter gear mechanism C, and the output differential gear unit D are arranged on different axes parallel to the input shaft 15. Various known internal combustion engines such as a spark ignition engine (gasoline engine) and a compression ignition engine (diesel engine) can be used as the internal combustion engine E. The input shaft 15 is drivingly coupled to the internal combustion engine E via a flywheel, a damper, and a clutch which are not shown. It is also preferable that the input shaft 15 be drivingly coupled to the internal combustion engine E via any one or two of the flywheel, the damper, and the clutch, or be directly drivingly coupled to the internal combustion engine E via none of the flywheel, the damper, and the clutch.

The first rotating electrical machine MG1 has a first stator St1 fixed to a case, and a first rotor Ro1 rotatably supported radially inward of the first stator St1. The first rotor Ro1 of the first rotating electrical machine MG1 is drivingly coupled via a rotor shaft to a sun gear s of the planetary gear unit PG so as to rotate therewith. The second rotating electrical machine MG2 has a second stator St2 fixed to the case, and a second rotor Ro2 rotatably supported radially inward of the second stator St2. The second rotor Ro2 of the second rotating electrical machine MG2 is coupled via a rotor shaft to a second rotating electrical machine output gear 19 so as to rotate therewith. The second rotating electrical machine output gear 19 meshes with a first counter gear 17 fixed to the counter gear mechanism C, so that rotation and driving force of the second rotating electrical machine MG2 are transmitted to the counter gear mechanism C. In this vehicle drive device 14, the first rotating electrical machine MG1 and the second rotating electrical machine MG2 are alternating current (AC) motors, and are driven and controlled by a first inverter and a second inverter, not shown, respectively.

The first rotating electrical machine MG1 is drivingly coupled to the input shaft 15 and the counter gear mechanism C via the planetary gear unit PG. The first rotating electrical machine MG1 mainly functions as a generator that generates electric power by the driving force received via the sun gear s to charge an electricity storage device, not shown, or to supply electric power for driving the second rotating electrical machine MG2. However, when a vehicle travels at a high speed, when the internal combustion engine E is started, etc., the first rotating electrical machine MG1 may function as a motor that performs power running to output driving force. The second rotating electrical machine MG2 is drivingly coupled to the planetary gear unit PG and the output differential gear unit D via the counter gear mechanism C. The second rotating electrical machine MG2 mainly functions as a motor that supplements driving force for moving the vehicle. However, when the vehicle is decelerated etc., the second rotating electrical machine MG2 functions as a generator and may function as a generator that regenerates an inertial force of the vehicle as electrical energy. That is, the rotating electrical machines MG form at least a part of the driving force source.

As shown in FIG. 2, the planetary gear unit PG is formed by a single-pinion type planetary gear mechanism placed coaxially with the input shaft 15. That is, the planetary gear unit PG has as rotating elements a carrier ca that supports a plurality of pinion gears, and the sun gear s and a ring gear r which mesh with the pinion gears. The input shaft 15 as an input member I, a differential input gear 20 as an output member O, and the first rotating electrical machine MG1 are drivingly coupled to the different rotating elements of the planetary gear unit PG, respectively. In this case, each of the input shaft 15, the differential input gear 20, and the first rotating electrical machine MG1 is drivingly coupled to a corresponding one of the three rotating elements, namely the sun gear s, the carrier ca, and the ring gear r of the planetary gear unit PG, via none of the other rotating elements as follows. In the present embodiment, the sun gear s is drivingly coupled to the first rotor Ro1 of the first rotating electrical machine MG1 so as to rotate therewith. The carrier ca is drivingly coupled to the input shaft 15 so as to rotate therewith. The ring gear r is drivingly coupled to a counter drive gear 16 so as to rotate therewith. This counter drive gear 16 meshes with the first counter gear 17 fixed to the counter gear mechanism C, so that rotation of the ring gear r of the planetary gear unit PG is transmitted to the counter gear mechanism C.

The first counter gear 17 is fixed to the internal combustion engine E side of a countershaft of the counter gear mechanism C, and a second counter gear 18 is fixed to the first and second rotating electrical machine MG1, MG2 side of the countershaft. The first counter gear 17 meshes with the counter drive gear 16 and the second rotating electrical machine output gear 19, and the second counter gear 18 meshes with the differential input gear 20 of the output differential gear unit D. The counter gear mechanism C is thus drivingly coupled to (the ring gear r of) the planetary gear unit PG the second rotating electrical machine MG2, and (the differential input gear 20 of) the output differential gear unit D. The output differential gear unit D is a commonly used differential gear unit, and has a differential gear mechanism using, e.g., a plurality of bevel gears meshing with each other. The output differential gear unit D distributes rotation and driving force transmitted to the differential input gear 20 to the wheels W as right and left driving wheels. In the present embodiment, the power distribution planetary gear unit PG the counter gear mechanism C, and the output differential gear unit D, to which driving force from the driving force source is transmitted, correspond to the "gear mechanism."

2. Configuration of Hydraulic Control Device

Next, the configuration of the hydraulic control device 1 that controls the pressure of oil that is discharged from the oil pump 13 to circulate in the vehicle drive device 14 will be described with reference to the hydraulic circuit diagram shown in FIG. 1.

As shown in FIG. 1, the hydraulic control device 1 is formed by the oil pump 13, oil passages 3 to 7 that guide oil discharged from the oil pump 13 to the rotating electrical machines MG and the gear mechanism 2, a first relief valve R1, a second relief valve R2, and a throttle portion 8. In the following description, the side closer to the oil pump 13 in each part of the oil passage is referred to as the "upstream side," and the side farther away from the oil pump 13 in each part of the oil passage is referred to as the "downstream side." That is, the "upstream side" refers to the side from which oil from the oil pump 13 flows into the oil passage, and the "downstream side" refers to the side from which oil from the oil pump 13 flows out of the oil passage.

The oil pump 13 is an oil pump that is driven by the driving force source for the wheels, and supplies oil stored in an oil pan 9 to the rotating electrical machines MG and the gear mechanism 2 via the oil passages 3 to 7. The oil pump 13 is connected to a strainer 10 and the common oil passage 5 (described below). In the present embodiment, the rotor of the oil pump 13 is drivingly coupled to the input shaft 15 as described above, and rotates at a speed proportional to the rotational speed of an output shaft of the internal combustion engine E. The oil pump 13 discharges the amount of oil according to the rotational speed of the rotor. That is, as the rotational speed of the output shaft of the internal combustion engine E increases, the flow rate of oil that is discharged from the oil pump 13 increases and a discharge pressure of the oil increases accordingly. Since the strainer 10 is connected to the upstream side of the oil pump 13, the oil pump 13 sucks oil stored in the oil pan 9 via the strainer 10, and discharges the sucked oil to the common oil passage 5. For example, an internal gear pump, an external gear pump, a vane pump, etc. can be used as the oil pump 13.

The oil pan 9 stores oil to be circulated in the vehicle drive device 14. As described in detail below, when the first relief valve R1 is open, a part of oil that is discharged from the first oil passage 3 flows into the oil pan 9 via the discharge oil passage 7.

The strainer 10 is a filter that is provided between the oil pan 9 and the oil pump 13 to remove foreign matter contained in oil stored in the oil pan 9 when the oil pump 13 sucks the oil.

The oil passages in the hydraulic control device 1 include the common oil passage 5 connected to the oil pump 13, the first oil passage 3 connected to the common oil passage 5 to guide oil flowing from the common oil passage 5 into the first oil passage 3 to the gear mechanism 2, and the second oil passage 4 branching off from a connection portion 11 between the common oil passage 5 and the first oil passage 3 to guide oil flowing from the common oil passage 5 into the second oil passage 4 to the rotating electrical machines MO. The oil passages further include the third oil passage 6 branching off from the first oil passage 3 to guide oil flowing from the first oil passage 3 into the third oil passage 6 to the rotating electrical machines MG, and the discharge oil passage 7 that guides oil discharged from the first oil passage 3 to the oil pan 9 when the first relief valve R1 is open. In the present embodiment, the oil passages 3 to 7 are formed in a wall that forms a case member (not shown) storing the vehicle drive device 14 therein, in a shaft member included in the vehicle drive device 14, in an oil passage forming member provided inside or outside the case member, etc.

The common oil passage 5 is an oil passage provided between the oil pump 13 and the first and second oil passages 3, 4 to guide oil discharged from the oil pump 13 to the first oil passage 3 and the second oil passage 4. In the present embodiment, the common oil passage 5 has its one end connected to a discharge port (not shown) of the oil pump 13 and the other end connected to the first oil passage 3 and the second oil passage 4 via the connection portion 11. The connection portion 11 is a portion where the common oil passage 5, the first oil passage 3, and the second oil passage 4 are connected. The common oil passage 5, a first upstream-side oil passage 3A as a part of the first oil passage 3 which is located upstream of the throttle portion 8, and a second upstream-side oil passage 4A as a part of the second oil passage 4 which is located upstream of the second relief valve R2 are therefore a continuous integral oil passage. Accordingly, the oil pressure in the common oil passage 5, the oil pressure in the first upstream-side oil passage 3A, and the oil pressure in the second upstream-side oil passage 4A are the same in a static state. These oil pressures in the oil passages located upstream of the throttle portion 8 are hereinafter referred to as the "throttle upstream oil pressure PA."

The first oil passage 3 is an oil passage that connects the common oil passage 5 and the gear mechanism 2 to guide oil flowing from the common oil passage 5 into this oil passage to the gear mechanism 2. The first relief valve R1 and the throttle portion 8 placed upstream of the first relief valve R1 are provided in the first oil passage 3. In the present embodiment, a part of the first oil passage 3 which is located upstream of the throttle portion 8 is referred to as the "first upstream-side oil passage 3A," and a part of the first oil passage 3 which is located downstream of the throttle portion 8 is referred to as the "first downstream-side oil passage 3B." The upstream end of the first oil passage 3 (first upstream-side oil passage 3A) is connected to the common oil passage 5 and the second oil passage 4 via the connection portion 11, and the downstream end of the first oil passage 3 (first downstream-side oil passage 3B) is connected to a first supply port S1 that supplies oil to the gear mechanism 2. The first oil passage 3 (first downstream-side oil passage 3B) has a branch portion 12 as a branch point to the third oil passage 6 at a position downstream of the first relief valve R1. That is, the first oil passage 3 is also connected to the third oil passage 6 via the branch portion 12, in addition to the common oil passage 5 and the first supply port S1 to the gear mechanism 2. As described below, the first oil passage 3 (first downstream-side oil passage 3B) is also connected to the discharge oil passage 7 via the first relief valve R1.

The throttle portion 8 is placed in a flow path of the first oil passage 3 which is located upstream of the first relief valve R1, and reduces the flow rate of oil passing through the throttle portion 8 to a value smaller than that on the upstream side of the throttle portion 8 (first upstream-side oil passage 3A) to generate a difference between the oil pressure in the first upstream-side oil passage 3A located upstream of the throttle portion 8 and the oil pressure in the first downstream-side oil passage 3B located downstream of the throttle portion 8. That is, the throttle portion 8 has a function to make the oil pressure in the first downstream-side oil passage 3B lower than that in the first upstream-side oil passage 3A with oil flowing in the first oil passage 3 at a certain flow rate or higher. The throttle portion 8 thus has a smaller sectional area than the first upstream-side oil passage 3A. In the present embodiment, the throttle portion 8 is configured so that the oil pressure in the second oil passage 4 located upstream of the throttle portion 8 (throttle upstream oil pressure PA) is larger than a first set oil pressure P1 described below with the first relief valve R1 discharging oil in the first downstream-side oil passage 3B. The oil pressure in the first downstream-side oil passage 3B as the first oil passage 3 located downstream of the throttle portion 8 is hereinafter referred to as the "throttle downstream oil pressure PB."

The first relief valve R1 is provided in the first downstream-side oil passage 3B located downstream of the throttle portion 8 in the first oil passage 3. The first relief valve R1 has it input port R1A connected to the first downstream-side oil passage 3B and its output port R1B connected to the discharge oil passage 7. The first relief valve R1 allows the first downstream-side oil passage 3B to communicate with the discharge oil passage 7 by allowing the input port R1A to communicate with the output port R1B when the oil passage in the first downstream-side oil passage 3B located downstream of the throttle portion 8, namely the throttle downstream oil pressure PB, becomes equal to or higher than a predetermined valve opening pressure. In other words, the first relief valve R1 discharges oil in the first oil passage 3 when the throttle downstream oil pressure PB in the first oil passage 3 located downstream of the throttle portion 8 becomes higher than the predetermined first set oil pressure P1. That is, the first set oil pressure P1 is the valve opening pressure for the first relief valve R1. In the present embodiment, the first relief valve R1 is a balanced piston relief valve having its input port R1A connected between the throttle portion 8 and the branch portion 12 in the first oil passage 3, and is normally open. A direct acting relief valve etc. may be used as the first relief valve R1, or other types of valves may be used as the first relief valve R1 as long as an operating pressure can be set for the valve.

In the present embodiment, the first set oil pressure P1 is set to an oil pressure in a predetermined range whose lower limit is a maximum required oil pressure PBmax. The maximum required oil pressure PBmax is the throttle downstream oil pressure PB in the first oil passage 3 at which oil is supplied to the gear mechanism 2 at a maximum flow rate required to lubricate the gear mechanism 2. The maximum flow rate required to lubricate the gear mechanism 2 is the flow rate of oil that is required to be supplied to the gear mechanism 2 in the state where lubrication of the gear mechanism 2 is most required within an expected range, such as, e.g., in the case where torque that is transferred by the gear mechanism 2 reaches its maximum. It is preferable that the first set oil pressure P1 be set to a pressure that is as close to the maximum required oil pressure PBmax as possible within a range of the maximum required oil pressure PBmax or higher which can ensure operation of the first relief valve R1, in view of an error between the set pressure and the operating pressure of the first relief valve R1. The oil pressure in the first downstream-side oil passage 3B (throttle downstream oil pressure PB) can thus be made as close to the first set oil pressure P1 as possible, thereby suppressing entry of an excessive amount of oil into the gear mechanism 2. Since the first set oil pressure P1 is set to the maximum required oil pressure PBmax or higher, insufficient supply of oil to the gear mechanism 2 can be suppressed.

The discharge oil passage 7 is an oil passage that is provided between the first relief valve R1 and the oil pan 9 to return excess oil from the first oil passage 3 into the oil pan 9. In the present embodiment, the upstream end of the discharge oil passage 7 is connected to the output port R1B of the first relief valve R1, and the downstream end of the discharge oil passage 7 is connected to the oil pan 9. In the case where the throttle downstream oil pressure PB in the first downstream-side oil passage 3B becomes higher than the first set oil pressure P1, oil flows from the first downstream-side oil passage 3B into the discharge oil passage 7 via the first relief valve R1.

The second oil passage 4 is an oil passage connecting the common oil passage 5 and the rotating electrical machines MG. In the present embodiment, the upstream end of the second oil passage 4 is connected to the common oil passage 5 and the first oil passage 3 via the connection portion 11, and the downstream end of the second oil passage 4 is connected to a second supply port 82 that supplies oil to the rotating electrical machines MG. The second relief valve R2 is provided in the second oil passage 4. In the present embodiment, a part of the second oil passage 4 which is located upstream of the second relief valve R2 is referred to as the "second upstream-side oil passage 4A," and a part of the second oil passage 4 which is located downstream of the second relief valve R2 is referred to as the "second downstream-side oil passage 4B." When the second relief valve R2 is opened, the second upstream-side oil passage 4A located upstream of the second relief valve R2 communicates with the second downstream-side oil passage 4B located downstream of the second relief valve R2. That is, oil flowing from the common oil passage 5 into the second oil passage 4 flows into the rotating electrical machines MG only when the second relief valve R2 is open.

The second relief valve R2 is provided at an intermediate position in the second oil passage 4, namely between the common oil passage 5 and the rotating electrical machines MG in the second oil passage 4. The second relief valve R2 has its input port R2A connected to the second upstream-side oil passage 4A and its output port R2B connected to the second downstream-side oil passage 4B. When the oil pressure in the second upstream-side oil passage 4A located upstream of the second relief valve R2, that is, the throttle upstream oil pressure PA, becomes equal to or higher than a predetermined valve opening pressure, the second relief valve R2 allows the input port R2A to communicate with the output port R2B to allow the part of the second oil passage 4 which is located upstream of the second relief valve R2 (second upstream-side oil passage 4A) to communicate with the part of the second oil passage 4 which is located downstream of the second relief valve R2 (second downstream-side oil passage 4B). In other words, the second relief valve R2 allows the part of the second oil passage 4 which is located upstream of the second relief valve R2 to communicate with the part of the second oil passage 4 which is located downstream of the second relief valve R2 when the throttle upstream oil pressure PA in the second oil passage 4 located upstream of the second relief valve R2 becomes higher than a predetermined second set oil pressure P2. That is, the second set oil pressure P2 is the valve opening pressure for the second relief valve R2. In the present embodiment, the second relief valve R2 is a balanced piston relief valve, and is normally closed. A direct acting relief valve etc. may be used as the second relief valve R2, or other types of valves may be used as the second relief valve R2 as long as an operating pressure can be set for the valve.

In the present embodiment, the second set oil pressure P2 is set to an oil pressure higher than the first set oil pressure P1. The throttle downstream oil pressure PB in the first downstream-side oil passage 3B is thus controlled to the first set oil pressure P1 so that an appropriate amount of oil can be supplied to the gear mechanism 2. If there is excess oil, the second relief valve R2 is opened so that the oil can be supplied to the rotating electrical machines MG. The oil thus supplied is used to cool or lubricate the rotating electrical machines MG. It is also preferable that the second set oil pressure P2 be set to an oil pressure lower than such an upper limit oil pressure PL that a part having the lowest pressure resistance in the entire hydraulic circuit communicating with the common oil passage 5 can withstand. The oil pressure in the entire hydraulic circuit can thus be made not to exceed the upper limit oil pressure PL. That is, the second relief valve R2 can be made to function as a safety valve for protection of the hydraulic circuit.

The third oil passage 6 is an oil passage that connects the first oil passage 3 and the rotating electrical machines MG to guide oil flowing from the first oil passage 3 into this oil passage to the rotating electrical machines MG. In the present embodiment, the upstream end of the third oil passage 6 is connected to the first oil passage 3 via the branch portion 12, and the downstream end of the third oil passage 6 is connected to a third supply port S3 that supplies oil to the rotating electrical machines MG. In other words, the third oil passage 6 branches off from the branch portion 12 located downstream of the first relief valve R1 in the first oil passage 3 and guides oil flowing from the first oil passage 3 into the third oil passage 6 to the rotating electrical machines MG. In the present embodiment, the third oil passage 6 is configured so that the amount of oil flowing into the third oil passage 6 is larger than that of oil flowing into a part of the first downstream-side oil passage 3B which is located downstream of the branch portion 12. Specifically, the third oil passage 6 has a larger sectional area than the first oil passage 3. A larger amount of oil can thus be supplied to the rotating electrical machines MG to which oil for both lubrication and cooling is desirably supplied, as compared to the amount of oil to be supplied to the gear mechanism 2 to which only oil for lubrication need be supplied.

2. Details of Hydraulic Control

Hydraulic control according to the present embodiment will be described in detail with reference to FIGS. 3 and 4.

Figure 3:
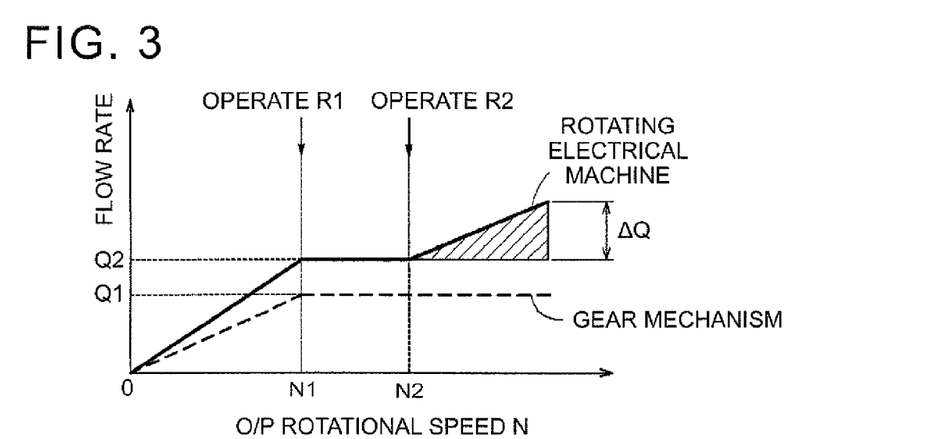
FIG. 3 is a diagram showing the relation between the flow rate of oil that is supplied to each part and the oil pump rotational speed when hydraulic control is performed.

FIG. 3 is a diagram showing the relation between each of the flow rates of oil that flows into the rotating electrical machines MG and the gear mechanism 2 and the oil pump rotational speed. FIG. 4 is a diagram showing the relation between each of the throttle upstream oil pressure PA and the throttle downstream oil pressure PB and the oil pump rotational speed. As used herein, "N" represents the oil pump rotational speed.

Figure 4:
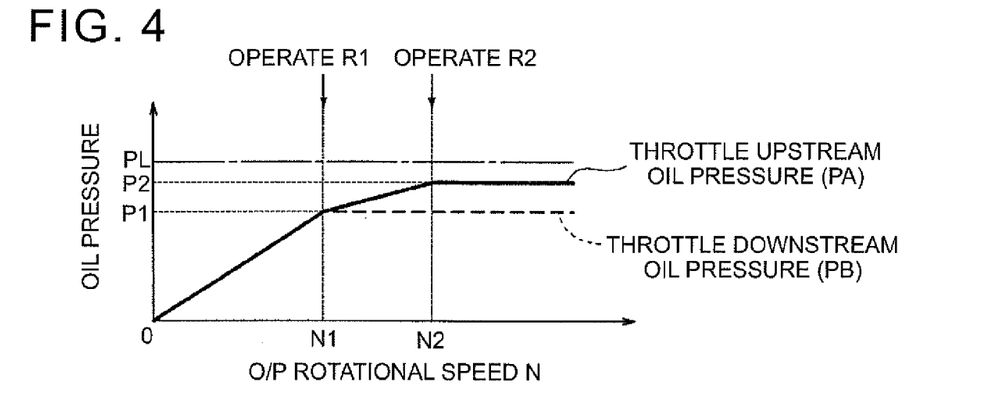
FIG. 4 is a diagram showing the relation between the oil pressure in each oil passage and the oil pump rotational speed when the hydraulic control is performed.

First, in the case where the oil pump rotational speed N has a value in the range of 0 to N1, that is, in the case of 0<N<N1, the throttle upstream oil pressure PA and the throttle downstream oil pressure PB are lower than the first set oil pressure P1 as shown in FIG. 4, and the first relief valve R1 is therefore in a closed state. The second relief valve R2, which is opened at the second set oil pressure P2 that is set to an oil pressure higher than the first set oil pressure P1, is also in a closed state. At this time, oil that is discharged from the oil pump 13 to the common oil passage 5 does not flow into the second downstream-side oil passage 4B, but flows into the first upstream-side oil passage 3A. The oil that has flown into the first upstream-side oil passage 3A flows through the throttle portion 8 into the first downstream-side oil passage 3B located downstream of the throttle portion 8. The oil that has flown into the first downstream-side oil passage 3B flows to the branch portion 12 without being discharged from the first relief valve R1. A part of the oil that has reached the branch portion 12 flows into the gear mechanism 2 via a part of the first downstream-side oil passage 3B which is located downstream of the branch portion 12, and the remainder flows into the rotating electrical machines MG via the third oil passage 6. At this time, since the third oil passage 6 has a larger sectional area than the first oil passage 3, the flow rate of the oil flowing into the third oil passage 6 is higher than that of the oil flowing into the part of the first downstream-side oil passage 3B which is located downstream of the branch portion 12. That is, the flow rate of the oil flowing into the rotating electrical machines MG is higher than that of the oil flowing into the gear mechanism 2. In the case of 0<N<N1, the flow rate of oil that is discharged from the oil pump 13 increases as the oil pump rotational speed N increases. As shown in FIG. 3, the flow rates of the oil flowing into the gear mechanism 2 and the rotating electrical machines MG therefore increase as the oil pump rotational speed N increases. The throttle upstream oil pressure PA and the throttle downstream oil pressure PB also increase accordingly, as shown in FIG. 4. In the case of 0<N<N1, the throttle portion 8 does not function, and the throttle upstream oil pressure PA is equal to the throttle downstream oil pressure PB.

Next, in the case where the oil pump rotational speed N is equal to N1 (N=N1), the throttle downstream oil pressure PB is equal to the first set oil pressure P1 as shown in FIG. 4, and the first relief valve R1 is opened. In the case of N=N1, the throttle upstream oil pressure PA is equal to the throttle downstream oil pressure PB, and both the throttle upstream oil pressure PA and the throttle downstream oil pressure PB are equal to the first set oil pressure P1. Since the throttle upstream oil pressure PA is therefore lower than the second set oil pressure P2, the second relief valve R2 remains in the closed state. In the case of N=N1, oil that is discharged from the oil pump 13 to the common oil passage 5 does not flow into the second downstream-side oil passage 4B, but flows into the first upstream-side oil passage 3A. The oil flowing into the first upstream-side oil passage 3A flows through the throttle portion 8 into the first downstream-side oil passage 3B located downstream of the throttle portion 8.

A part of the oil that has flown into the first downstream-side oil passage 3B flows into the discharge oil passage 7 as the first relief valve R1 is open, and the remainder flows to the branch portion 12 in the first downstream-side oil passage 3B. A part of the oil that has reached the branch portion 12 flows into the gear mechanism 2 via the part of the first downstream-side oil passage 3B which is located downstream of the branch portion 12, and the remainder flows into the rotating electrical machines MG via the third oil passage 6. As used herein, the "first reference flow rate Q1" and the "second reference flow rate Q2" respectively refer to the flow rate of oil flowing into the gear mechanism 2 and the flow rate of oil flowing into the rotating electrical machines MG in the case of N=N1, that is, in the case where the throttle downstream oil pressure PB is equal to the first set oil pressure P1.

In the case where the oil pump rotational speed N has a value in the range of N1 to N2, that is, in the case of N1<N<N2, the first relief valve R1 is in an open state, and the throttle downstream oil pressure PB is controlled to be constant at the first set oil pressure P1. As shown in FIG. 4, in the state of N1<N<N2, the throttle upstream oil pressure PA is lower than the second set oil pressure P2, the second relief valve R2 is in a closed state. Oil that is discharged from the oil pump 13 to the common oil passage 5 therefore does not flow into the second downstream-side oil passage 4B, but flows into the first upstream-side oil passage 3A. The oil that has flown into the first upstream-side oil passage 3A flows through the throttle portion 8 into the first downstream-side oil passage 3B located downstream of the throttle portion 8. A part of the oil that has flown into the first downstream-side oil passage 3B flows into the discharge oil passage 7 as the first relief valve R1 is open, and the remainder flows to the branch portion 12 in the first downstream-side oil passage 3B. A part of the oil that has reached the branch portion 12 flows into the gear mechanism 2 via the part of the first downstream-side oil passage 3B which is located downstream of the branch portion 12, and the remainder flows into the rotating electrical machines MG via the third oil passage 6. In this case as well, the flow rate of the oil flowing into the third oil passage 6 is higher than that of the oil flowing into the part of the first downstream-side oil passage 3B which is located downstream of the branch portion 12. That is, the flow rate of the oil flowing into the rotating electrical machines MG is higher than that of the oil flowing into the gear mechanism 2. On the other hand, the oil that has flown into the discharge oil passage 7 is discharged to the oil pan 9.

In the state of N1<N<N2, the throttle downstream oil pressure PB is also going to increase as the oil pump rotational speed N increases. However, since the first relief valve R1 is opened to adjust the flow rate in the part of the first oil passage 3 which is located downstream of the throttle portion 8, the throttle downstream oil pressure PB becomes constant at the first set oil pressure P1. Specifically, in the case where the throttle downstream oil pressure PB is equal to the first set oil pressure P1, the flow rate of the oil that flows into the first downstream-side oil passage 3B is the sum (Q1+Q2) of the first reference flow rate Q1 of oil flowing into the gear mechanism 2 and the second reference flow rate Q2 of oil flowing into the rotating electrical machines MG. If oil flows into the first downstream-side oil passage 3B at a flow rate higher than "Q1+Q2," the excess oil exceeding "Q1+Q2" is discharged into the discharge oil passage 7 by the first relief valve R1. In the state of N1<N<N2, the throttle downstream oil pressure PB is thus kept at the first set oil pressure P1, and the flow rate of the oil flowing into the first downstream-side oil passage 3B is also kept constant at "Q1+Q2," as shown in FIG. 3. The oil flowing into the gear mechanism 2 is kept constant at the first reference flow rate Q1, and the oil flowing into the rotating electrical machine MG is kept constant at the second reference flow rate Q2. On the other hand, there is a difference between the throttle downstream oil pressure PB as the oil pressure in the first downstream-side oil passage 3B and the throttle upstream oil pressure PA as the oil pressure in the first upstream-side oil passage 3A due to the function of the throttle portion 8, and only the throttle upstream oil pressure PA increases as the oil pump rotational speed N increases.

In the case where the oil pump rotational speed N of the oil pump 13 is equal to N2 (N=N2), the throttle upstream oil pressure PA is equal to the second set oil pressure P2 as shown in FIG. 4, and the second relief valve R2 is opened. The part of the second oil passage 4 which is located upstream of the second relief valve R2 (second upstream-side oil passage 4A) thus communicates with the part of the second oil passage 4 which is located downstream of the second relief valve R2 (second downstream-side oil passage 4B), and oil that is discharged from the oil pump 13 to the common oil passage 5 flows also into the second downstream-side oil passage 4B. Since the operation in the case of N=2 is the same as that in the case of N1<N<N2 except that the second relief valve R2 is opened and the oil from the common oil passage 5 flows into the second downstream-side oil passage 4B, description thereof is omitted.

In the case where the oil pump rotational speed N of the oil pump 13 is larger than N2, that is, in the case of N>N2, both the first relief valve R1 and the second relief valve R2 are open, and the throttle upstream oil pressure PA is constant at the second set oil pressure P2 and the throttle downstream oil pressure PB is constant at the first set oil pressure P1, as shown in FIG. 4. In the case of N>N2, oil that is discharged from the oil pump 13 to the common oil passage 5 flows into both the first downstream-side oil passage 3B and the second downstream-side oil passage 4B. A part of the oil that has flown into the first downstream-side oil passage 3B flows into the discharge oil passage 7 as the first relief valve R1 is open, and the remainder flows to the branch portion 12 in the first downstream-side oil passage 3B. A part of the oil that has reached the branch portion 12 flows into the gear mechanism 2 via the part of the first downstream-side oil passage 3B which is located downstream of the branch portion 12, and the remainder flows into the rotating electrical machines MG via the third oil passage 6. In the case of N>N2, the flow rate of the oil flowing from the first oil passage 3 into the gear mechanism 2 is kept constant at the first reference flow rate Q1, and the flow rate of the oil flowing from the third oil passage 6 into the rotating electrical machines MG is kept constant at the second reference flow rate Q2. The oil that has flown into the discharge oil passage 7 is discharged to the oil pan 9.

On the other hand, the oil that has flown into the second downstream-side oil passage 4B flows into the rotating electrical machines MG. The flow rate of the oil flowing into the rotating electrical machines MG via the second downstream-side oil passage 4B is herein referred to as the "additional supply flow rate ΔQ." In the case of N>N2, the flow rate of the oil that flows into the rotating electrical machines MG is the sum (Q2+ΔQ) of the second reference flow rate Q2 of the oil flowing into the rotating electrical machines MG via the third oil passage 6 and the additional supply flow rate ΔQ of the oil flowing into the rotating electrical machines MG via the second oil passage 4. In the case of N>N2, the flow rate in the first downstream-side oil passage 3B is controlled to be constant at "Q1+Q2." Accordingly, most of the oil from the oil pump 13 that discharges a larger amount of oil as the oil pump rotational speed N increases flows into the rotating electrical machines MG via the second oil passage 4. As shown in FIG. 3, the additional supply flow rate ΔQ of the oil flowing into the rotating electrical machines MG via the second oil passage 4 therefore increases as the oil pump rotational speed N increases. In such a drive device for 2-motor split type hybrid vehicles as in the present embodiment, the first rotating electrical machine MG1 and the second rotating electrical machine MG2 often have large output torque if the rotational speed of the internal combustion engine E (i.e., the oil pump rotational speed N) is high and the internal combustion engine E has large output torque. In a situation where the first rotating electrical machine MG1 and the second rotating electrical machine MG2 have large output torque, the first rotating electrical machine MG1 and the second rotating electrical machine MG2 generate a large amount of heat, and the need to supply oil to the first rotating electrical machine MG1 and the second rotating electrical machine MG2 to cool them is increased. In drive devices for vehicles different from the present embodiment as well, the rotating electrical machine MG forming at least a part of the driving force source for the wheels W typically tends to generate a larger amount of heat as the rotational speed of the oil pump 13 that is driven by the driving force source for the wheels W increases. In the hydraulic control device 1 according to the present embodiment, oil of the additional supply flow rate ΔQ can be supplied to the rotating electrical machine MO in addition to oil of the second reference flow rate Q2 in such a situation where the rotating electrical machine MG is likely to generate a large amount of heat. Oil can thus be appropriately supplied even in a situation where cooling or lubrication of the rotating electrical machine MG is particularly required.

4. Other Embodiments (1) In the above embodiment, the rotor of the oil pump 13 is coupled to the input shaft 15 of the internal combustion engine E, and is driven by the internal combustion engine E. However, embodiments are not limited to this configuration. The oil pump 13 may be configured so that the rotor of the oil pump 13 rotates together with a member that rotates at a speed proportional to that of the wheels W such as, e.g., a countershaft or an output member.

Figure 5:
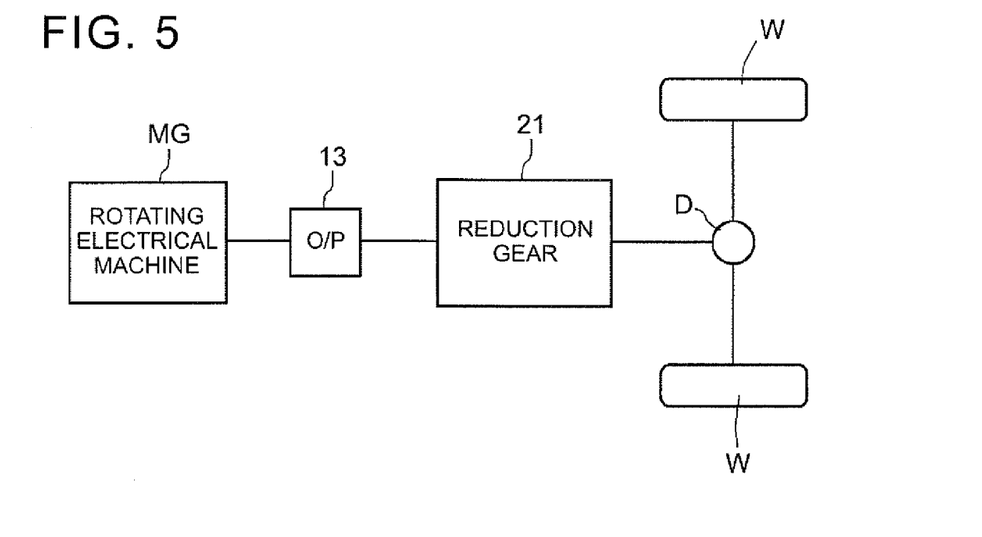
FIG. 5 is a diagram showing the overall configuration of an electric car having the hydraulic control device mounted thereon.

(2) The above embodiment is described with respect to an example applied to 2-motor split type hybrid vehicles. However, embodiments are not limited to this configuration. For example, as shown in FIG. 5, an embodiment may be applied to electric vehicles. In this case, the oil pump 13 is configured so that the rotor of the oil pump 13 is drivingly coupled to the rotor shaft of the rotating electrical machine MG as a driving force source and rotates at a speed proportional to that of rotation of the rotor of the rotating electrical machine MG. Oil discharged from the oil pump 13 is supplied to the rotating electrical machine MG and a reduction gear 21 as the gear mechanism 2 via the oil passages 3 to 6, the throttle portion 8, the first relief valve R1, and the second relief valve R2, as in the above embodiment.

(3) In the above embodiment, the discharge oil passage 7 is connected to the oil pan 9. However, embodiments are not limited to this configuration. For example, the discharge oil passage 7 may be connected to the oil passage between the oil pump 13 and the strainer 10. According to this configuration, since oil having the first set oil pressure P1 can be supplied to the downstream side of the oil pump 13, drive loss of the oil pump 13 can be reduced.

(4) In the above embodiment, the third oil passage 6 has a larger sectional area than the first oil passage 3. However, embodiments are not limited to this configuration. The first oil passage 3 and the third oil passage 6 may have the same sectional area. Alternatively, the third oil passage 6 may have a smaller sectional area than the first oil passage 3.

(5) In the above embodiment, the hydraulic control device 1 includes the third oil passage 6. However, embodiments are not limited to this configuration. The hydraulic control device 1 may not include the third oil passage 6. In this case, oil is supplied to the rotating electrical machines MG only via the second relief valve R2 and the second oil passage 4.

INDUSTRIAL, APPLICABILITY

Embodiments can be preferably used for hydraulic control devices including an oil pump that is driven by a driving force source for wheels, and an oil passage that guides oil discharged from the oil pump to a rotating electrical machine that forms at least a part of the driving force source and a gear mechanism to which driving force from the driving force source is transmitted.

DESCRIPTION OF THE REFERENCE NUMERALS

1: Hydraulic Control Device
2: Gear Mechanism
3: First Oil Passage
4: Second Oil Passage
5: Common Oil Passage
6: Third Oil Passage
8: Throttle Portion
11: Connection Portion
12: Branch Portion
13: Oil Pump
E: Internal Combustion Engine (Driving Force Source)
D: Output Differential Gear Unit (Gear Mechanism)
C: Counter Gear Mechanism (Gear Mechanism)
MG: Rotating Electrical Machine
R1: First Relief Valve
R2: Second Relief Valve
P1 First Set Oil Pressure
P2: Second Set Oil Pressure
PA: Throttle Upstream Oil Pressure (Oil Pressure in Second Oil Passage Located Upstream of Second Relief Valve)
PB: Throttle Downstream Oil Pressure (Oil Pressure in First Oil Passage Located Downstream of Throttle Portion)
PL: Upper Limit Oil Pressure
PBmax: Maximum Required Oil Pressure

The invention claimed is:

1. A vehicle hydraulic control device including:
an oil pump that is driven by a driving force source for wheels; and
an oil passage that guides oil discharged from the oil pump to a rotating electrical machine that forms at least a part of the driving force source and a gear mechanism to which driving force from the driving force source is transmitted, wherein
the oil passage includes a common oil passage connected to the oil pump, a first oil passage connected to the common oil passage to guide oil flowing from the common oil passage into the first oil passage to the gear mechanism, and a second oil passage branching off from a connection portion between the common oil passage and the first oil passage to guide oil flowing from the common oil passage into the second oil passage to the rotating electrical machine, a first relief valve and a throttle portion placed upstream of the first relief valve are provided in the first oil passage, a second relief valve is provided in the second oil passage, the first relief valve discharges oil in the first oil passage when an oil pressure in the first oil passage located downstream of the throttle portion becomes higher than a predetermined first set oil pressure, the second relief valve allows a part of the second oil passage which is located upstream of the second relief valve to communicate with a part of the second oil passage which is located downstream of the second relief valve when an oil pressure in the second oil passage located upstream of the second relief valve becomes higher than a predetermined second set oil pressure, and the second set oil pressure is set to an oil pressure higher than the first set oil pressure.

2. The vehicle hydraulic control device according to claim 1, further comprising:

a third oil passage that branches off from a branch portion located downstream of the first relief valve in the first oil passage and guides oil flowing from the first oil passage into the third oil passage to the rotating electrical machine.

3. The vehicle hydraulic control device according to claim 2, wherein the second relief valve allows the part of the second oil passage which is located upstream of the second relief valve to communicate with the part of the second oil passage which is located downstream of the second relief valve at an oil pressure lower than such an upper limit oil pressure that a part having lowest pressure resistance in an entire hydraulic circuit communicating with the common oil passage can withstand.

4. The vehicle hydraulic control device according to claim 3, wherein the throttle portion is configured so that when the first relief valve is discharging oil in the first oil passage, the oil pressure in the second oil passage located upstream of the second relief valve is higher than the first set oil pressure.

5. The vehicle hydraulic control device according to claim 4, wherein such an oil pressure in the first oil passage that supplies oil to the gear mechanism at a maximum flow rate required to lubricate the gear mechanism is a maximum required oil pressure, and the first set oil pressure is set to an oil pressure in a predetermined range whose lower limit is the maximum required oil pressure.

6. The vehicle hydraulic control device according to claim 3, wherein such an oil pressure in the first oil passage that supplies oil to the gear mechanism at a maximum flow rate required to lubricate the gear mechanism is a maximum required oil pressure, and the first set oil pressure is set to an oil pressure in a predetermined range whose lower limit is the maximum required oil pressure.

7. The vehicle hydraulic control device according to claim 2, wherein such an oil pressure in the first oil passage that supplies oil to the gear mechanism at a maximum flow rate required to lubricate the gear mechanism is a maximum required oil pressure, and the first set oil pressure is set to an oil pressure in a predetermined range whose lower limit is the maximum required oil pressure.

8. The vehicle hydraulic control device according to claim 1, wherein the second relief valve allows the part of the second oil passage which is located upstream of the second relief valve to communicate with the part of the second oil passage which is located downstream of the second relief valve at an oil pressure lower than such an upper limit oil pressure that a part having lowest pressure resistance in an entire hydraulic circuit communicating with the common oil passage can withstand.

9. The vehicle hydraulic control device according to claim 8, wherein the throttle portion is configured so that when the first relief valve is discharging oil in the first oil passage, the oil pressure in the second oil passage located upstream of the second relief valve is higher than the first set oil pressure.

10. The vehicle hydraulic control device according to claim 9, wherein such an oil pressure in the first oil passage that supplies oil to the gear mechanism at a maximum flow rate required to lubricate the gear mechanism is a maximum required oil pressure, and the first set oil pressure is set to an oil pressure in a predetermined range whose lower limit is the maximum required oil pressure.

11. The vehicle hydraulic control device according to claim 8, wherein such an oil pressure in the first oil passage that supplies oil to the gear mechanism at a maximum flow rate required to lubricate the gear mechanism is a maximum required oil pressure, and the first set oil pressure is set to an oil pressure in a predetermined range whose lower limit is the maximum required oil pressure.

12. The vehicle hydraulic control device according to claim 1, wherein the throttle portion is configured so that when the first relief valve is discharging oil in the first oil passage, the oil pressure in the second oil passage located upstream of the second relief valve is higher than the first set oil pressure.

13. The vehicle hydraulic control device according to claim 12, wherein such an oil pressure in the first oil passage that supplies oil to the gear mechanism at a maximum flow rate required to lubricate the gear mechanism is a maximum required oil pressure, and the first set oil pressure is set to an oil pressure in a predetermined range whose lower limit is the maximum required oil pressure.

14. The vehicle hydraulic control device according to claim 1, wherein such an oil pressure in the first oil passage that supplies oil to the gear mechanism at a maximum flow rate required to lubricate the gear mechanism is a maximum required oil pressure, and the first set oil pressure is set to an oil pressure in a predetermined range whose lower limit is the maximum required oil pressure.

* * * * *